United States Patent Office 3,764,386
Patented Oct. 9, 1973

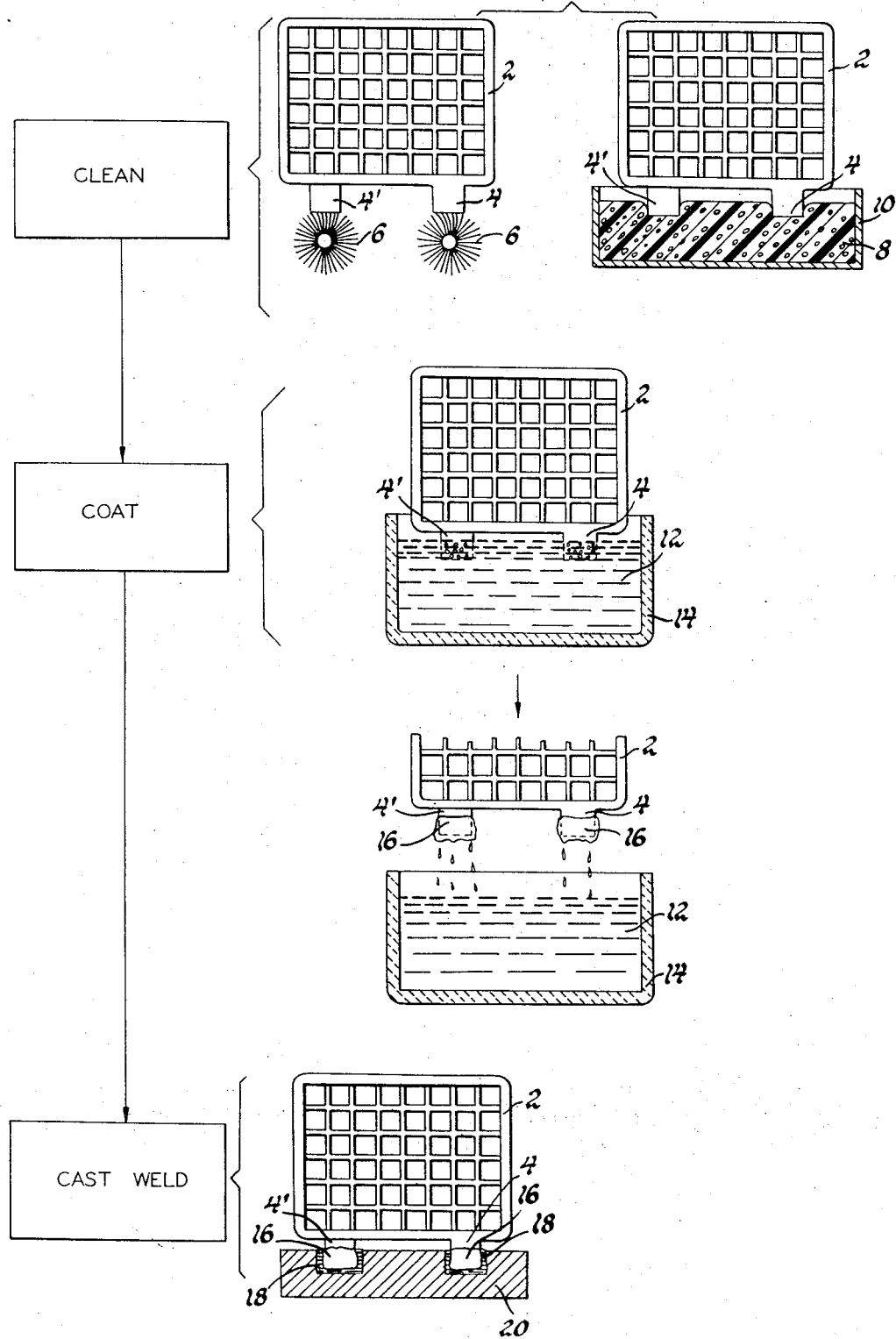

3,764,386
CASTING PLATE STRAPS TO BATTERY PLATES AND A LEAD-ACID STORAGE BATTERY UTILIZING SAME
Renard E. Mix, Yorktown, Ind., assignor to General Motors Corporation, Detroit, Mich.
Original application Aug. 25, 1969, Ser. No. 852,605, now Patent No. 3,652,337. Divided and this application Oct. 21, 1971, Ser. No. 191,456
Int. Cl. H01m 35/32, 39/00
U.S. Cl. 136—26
2 Claims

ABSTRACT OF THE DISCLOSURE

A lead-acid storage battery group containing positive and negative plates with supporting lead alloy grids, separators between the plates and plate straps cast onto the grids. The plate straps are bonded to the grids through a lead alloy bond having a melting point about 200° F. lower than the melting point of the grid alloy.

---

This is a division of application Ser. No. 852,605 filed Aug. 25, 1969, now U.S. Pat. No. 3,652,337, and assigned to the assignee of the present application. High production rates call for processes which can be carried out automatically over a broad range of operating conditions and with a minimum amount of closely controlled process parameters. The cast-on method for forming battery plate straps has heretofore required close supervision if consistently reliable welds were to be produced automatically and at acceptable production rates. The basic process and variations thereon have been known for many years.

It is an object of this invention to relax the controls required and the broaden the process parameters to a point where a high yield of reliably bonded cell groups can be produced on automated equipment, especially as these parameters relate to plate cleaniness, plate temperature, plate strap material and plate strap mold temperatures.

This object is accomplished by providing a molten film of a low melting point lead alloy on that portion (i.e., a lug) of the plate which is to be joined with the plate strap material. The coated lug is immersed in molten plate strap material while the film is still molten. This film is comprised of a material having a melting point of at least about 200° F. below the melting point of the plate lug.

In conjunction with the attached drawing, the following is a more detailed discussion of the process of this invention. The left side of the drawing shows the three basic steps involved in this process. The right side of the drawing graphically depicts the process. A battery plate 2 is provided with a lug 4. The active material or paste is not shown. A number of alternately spaced positive and negative plates with separators therebetween form a cell group which ultimately forms one cell of the finished battery. 4' indicates the lug of a negative plate when the plate 2 is a positive. The specific shape of the plate is not particularly significant and may have any shape such as that disclosed in copending application Ser. No. 780,068, entitled "Battery Plate Grid," filed Nov. 29, 1968, now U.S. Pat. No. 3,556,854 in the name of Wheadon et al. and assigned to the assignee of this invention. Regardless of the precise shape of the plate 2, it need only have a weldable portion (e.g., lug 4) adapted to be joined to plate straps for joining the respective positive and negative plates together into a single cell group. In a lead acid storage battery, the lug 4 would normally be comprised of lead or a lead alloy and containing antimony or calcium and possibly some arsenic or tin. These alloying ingredients are provided to give strength to the lead and to impart better flowability or castability to the lead melt. Similarly, the plate strap material would also comprise principally lead with small amounts of these other alloying ingredients.

The lugs 4 are cleaned to increase their wettability and insure good reliable bonds. Cleaning removes any foreign matter on the lugs including any accumulated oxides. A preferred form of cleaning the Pb-alloy lug 4 comprises an initial brushing with rotary brushes 6 which need only contact the ends of the lugs 4 and penetrate between the several lugs to a depth of about ⅛ inch. This is preferably followed by a fluxing operation which removes oxides by dissolution or reducing them to their basis metal. In a preferred form the ends of the lugs 4 are contacted by a sponge 8 saturated with flux which is held in an open pan 10 and raised into contacting position when the inverted lugs 4 pass over a fluxing station. The ends and first one-eighth inch or so of the lugs 4 are fluxed. In a preferred embodiment, the flux comprises an aqueous solution of stannous chloride and a wetting agent. An alternative flux comprises rosin dissolved in alcohol or weak ammonium or sodium hydroxide with or without a wetting agent.

After cleaning, the lugs 4 are dipped into a melt 12 of a lead alloy having a melting point at least about 200° F. less than the melting point of the lugs 4. The melt comprises lead alloys which are metallurgically and electrochemically compatible with the Pb-acid system. Thus the alloys should not be so readily oxidized as to interfere with subsequent bonding and should not contain elements which tend to set up stray currents or promote self-discharge of the cell. The melt drives off the flux solvent and wets the lug 4. The lug 4 is held in the melt 12 long enough for a solid-liquid type diffusion bond to be formed over the wetted surface and for the lug 4 to pick up enough heat to retain a film of the alloy 12 molten until the casting step. Generally, any low melting point lead-rich alloy which is metallurgically and electrochemically compatible with the other constituents of the cell and which melts at a temperature somewhere below about 350° F. is acceptable, whether that alloy be binary, ternary or otherwise. It is preferred that the alloy 12 have a melting point less than about 320° F. In this regard, lead-bismuth-tin alloys are particularly useful since they are not readily oxidized in this environment, produce an excellent bond and do not appear to affect the electrochemistry of the finished battery. Any of a number of compositions are available in the Pb-Bi-Sn system by properly proportioning the percentages of lead, bismuth and tin in the ranges of about 20% to about 70% bismuth, 20% to about 75% tin, and the balance lead. It is especially preferred to use alloys containing as much lead as possible and which have a tin to bismuth ratio of about 0.8 to 1. Though some possible candidates for the alloy 12 will be less desirable than others, other acceptable alloys can be selected from appropriate metals handbooks and accordingly are not endlessly repeated here. The alloy 12 is maintained in a molten condition in a tray 14 which is raised and lowered to contact the lugs 4 with the alloy 12. The alloy 12 is maintained in the tray 14 at a temperature substantially above its melting point and preferably between about 400° F. to about 600° F. with about 450° F. being most preferred. The use of these higher temperatures insures sufficient heat retention in the lug that the film 16, formed on the lug, will remain in the molten state at the time the lug 4 is immersed into the strap-forming material 18 in a subsequent operation. In this regard, the lug 4 is immersed in the alloy 12 for a sufficient time for the lug 4 to pick up enough heat which, in combination with the heat in the film 16, maintains the molten condition. Though some of the flux solvent is vaporized while the plate is in transit to the alloy melt 12, the remainder is driven off in the alloy melt 12. The solvent vapor rises as bubbles through the melt 12 along the surface of the lugs 4. To minimize bubbles, forced air can be passed over and through the lugs between the fluxing and the coating station operations to accelerate solvent vaporization. In the alternative, a solvent having a high vapor pressure may be used.

While in the melt 12 a solid-liquid diffusion bond or joint occurs at the interface between the melt 12 and the melt-wetted lugs 4. Like any metallurgical treatment, there is a time-temperature relation which dictates the precise composition of the thus formed joint upon solidification. Metallographically, a sharp change in alloy composition can be seen at this joint. The term "solid-liquid diffusion joint" is used to characterize this joint which is formed when the high melting point, solid lug is held in contact with the low melting point liquid alloy 12 such that some Bi and Sn will diffuse into the surface of the lug and some of the lug surface will dissolve in the alloy 12.

When removed from the melt 12 a thin film 16 of molten alloy 12 clings to the lugs 4. In this condition, the cell group is rapidly transferred to a plate-strap casting station where the lugs are immersed into a mold 20 filled with molten-strap-forming material 18. Like the lug 4, the strap-forming material 18 consists essentially of Pb with some strength and some flow improvers such as Ca, Sb, Sn, and/or As added. The immersion occurs while the film 16 is in the molten state in order to provide a liquid-liquid interface between the plate strap material 18 and the film 16. Film 16 compositions of electrochemically compatible lead alloys which are molten immediately on contact with the strap-forming material are considered part of this invention. The coated surface of the lugs 4, provided by the film 16, causes instant wetting by the plate-strap material 18. The miscibility of the film and the plate strap materials at their liquid-liquid interface causes a virtually seamless joint which is rich in bismuth and tin on the film side and which fades asymptotically with respect to Bi and Sn on the strap side. The term "liquid-liquid diffusion joint" is used to characterize this joint. The film 16 tends to wipe back somewhat as the lug 4 is immersed into the fused plate-strap material 18. This causes a somewhat thinner film 16 at the lug tip than at a portion of the lug closer to the plate 2.

The plate-strap lead alloy melts around 580° F. and is heated in a separate pot to about 900° F.±25° F. The lead 18 is introduced into the mold 20 at about this temperature. The mold 20 temperature varies between about 300° F. and about 500° F. By the time the mold 20 is filled and the ends of the lugs 4 contact the surface of the molten lead melt 18 the melt's temperature has dropped to about 800° F. After the lugs 4 have been immersed into the molten lead 18 the melt temperature drops faster owing to the heat sink effect of the lugs 4 and plates 2. The melt 18 is allowed to cool until solidification occurs at which time the strap is ejected from the mold by appropriate ejector means, not shown.

The solidified product comprises three separate regions or layers in which the lug alloy forms one layer, the low melting alloy the second layer, and the plate-strap alloy the third layer. The low melting alloy is bonded to the lug through a joint resulting from the diffusion and dissolution occurring at the solid-liquid interface during the film-forming dip. Metallographically there is a rather sharp alloy composition change at this joint. Contrariwise, the joint between the film and the plate-strap material results from a combination of miscibility of the film with the plate-strap material and diffusion of the respective materials one into the other resulting in a metallographically less distinct alloy composition change. Some further diffusion of the film forming alloying constituents into the lug material occurs during the casting step.

In a specific example of this process, the lug 4 comprises about 6% antimony, about 0.6% arsenic and about 0.45% to about 0.75% tin and the balance lead. This alloy melts at about 550° F.±5° F. The low melting point alloy 12 comprises about 33% bismuth, about 27% tin and the balance lead and melts at about 278° F. The alloy 12 is maintained in the tray 14 at a temperature of about 450° F. The plate-strap forming alloy 18 contains about 3% antimony, about 0.1 to about 0.5% tin and about 0.05% to about 0.3% arsenic and melts at about 580° F.±about 5° F. The plate-strap material 18 is heated to 925° F. in a pot and held ready for casting into the mold 30 which is held at about 400° F. The flux in the sponge 8 comprises an aqueous solution of stannous chloride and a wetting agent. The lugs 4 are cleaned and fluxed for about 15 seconds. The cell group is then realigned to insure proper placement of the plates, separators and lugs. The realignment takes about 15 seconds. In the next 13 seconds the cell group is inverted with the lugs facing downwardly and is ready for the coating step. The lugs are next immersed in the alloy 12 for about 7 secs. which is sufficient time to drive off any flux solvent, activate the flux and permit the alloy 12 to wet and bond to the lug 4. The lug temperature raises to about 300° F. In the next 5 seconds the lugs are removed from alloy melt 12 and prepared for immersion into the plate strap material 18. In this interval the film 16 of low melting alloy 12 is kept molten by the retained heat in the film 16 and the lugs 4. The lugs 4 are next plunged into the melt 18. This plunging takes about 0.4 seconds to immerse the desired amount (about ½) of the lug 4 in the melt. The melt 18 is introduced into a 400° F. mold at a temperature of about 925° F. By the time the ends of the lugs 4 contact the melt 18 this temperature has fallen to about 800° F. and, by the time the lugs are completely immersed, to about 750° F. The casting cools for about 15 seconds and is ejected and the process repeats itself.

While I have described my invention primarily in terms of specific embodiments thereof, I do not intend to be limited thereto except to the extent hereinafter set forth.

I claim:

1. A lead-acid storage battery cell group comprising: a plurality of alternately spaced positive and negative plates having a plurality of separators interjacent said positive and negative plates each of said plates having a supporting grid comprising a first lead alloy; a plate strap cast to and joining the grids of said positive plates one to the other; a plate strap cast to and joining the grids of said negative plates one to the other; said plate straps comprising a second lead alloy; and a third lead alloy between and joining said grids to said straps wherein said third lead alloy melts at a temperature at least about 200° F. lower than said first lead alloy.

2. A lead-acid storage battery cell group comprising: a plurality of alternatively spaced positive and negative plates having a plurality of separators interjacent said positive and negative plates having a supporting grid comprising a first lead alloy;

a plate strap cast-on and joining the grids of said positive plates one to the other;

a plate strap-cast-on and joining the grids of said negative plates one to the other; and a lead-bismuth-tin alloy between and joining said grids to said straps wherein the lead-bismuth-tin alloy at the time of casting the straps to the grids melted below about 350° F. and contained about 20%–70% by weight bismuth, 20%–75% by weight tin and the balance principally lead.

References Cited
UNITED STATES PATENTS

| | | | |
|---|---|---|---|
| 971,136 | 9/1910 | Monnot | 117—102 M |
| 3,072,984 | 1/1963 | Bronstert | 136—134 R X |
| 3,238,579 | 3/1966 | Sabatino et al. | 136—176 X |
| 3,343,997 | 9/1967 | Tiegel | 136—176 |
| 3,579,386 | 5/1971 | Tiegel et al. | 136—134 R |

ANTHONY SKAPARS, Primary Examiner

U.S. Cl. X.R.

136—134 R

PO-1050
(5/69)

UNITED STATES PATENT OFFICE
CERTIFICATE OF CORRECTION

Patent No. 3,764,386      Dated October 9, 1973

Inventor(s) Renard E. Mix

It is certified that error appears in the above-identified patent and that said Letters Patent are hereby corrected as shown below:

In the title (sheet of drawings only) "Plate Land " should read -- Plates And --. Column 4, line 50, after "mold" insert -- 20 --; line 75, "alternatively" should read -- alternately --.

Signed and sealed this 23rd day of April 1974.

(SEAL)
Attest:

EDWARD M. FLETCHER, JR.
Attesting Officer

C. MARSHALL DANN
Commissioner of Patents